United States Patent [19]

Thompson

[11] 4,030,300

[45] June 21, 1977

[54] POWER GENERATING SYSTEM

[76] Inventor: William C. Thompson, P.O. Box 271, Desert Hot Springs, Calif. 92240

[22] Filed: Aug. 10, 1976

[21] Appl. No.: 713,112

Related U.S. Application Data

[63] Continuation-in-part of Ser. No. 549,352, Feb. 12, 1975, abandoned.

[52] U.S. Cl. .................................. 60/639; 198/854
[51] Int. Cl.² .......................................... F03G 3/04
[58] Field of Search .......... 198/608, 611, 832, 854; 60/639

[56] References Cited

UNITED STATES PATENTS

| 1,054,710 | 3/1913 | Olson | 60/639 X |
| 1,193,362 | 8/1916 | Crosby et al. | 60/639 |

*Primary Examiner*—Allen M. Ostrager
*Attorney, Agent, or Firm*—Huebner & Worrel

[57] ABSTRACT

An electric power generating system in which solid material is caused to flow by gravity from an upper level to a lower level onto a wheel or a series of wheels which are caused to rotate by the weight of the material on blades spaced along the periphery of the wheels. The wheels are interconnectable and in a system which drives electrical generators to produce power.

21 Claims, 8 Drawing Figures

POWER GENERATING SYSTEM

CROSS-REFERENCE TO RELATED APPLICATION

This is a continuation-in-part of application, Ser. No. 549,352, filed Feb. 12, 1975, now abandoned.

BACKGROUND OF THE INVENTION

The invention relates to the production of power which results from gravity flow of solid material onto devices which are caused to rotate as a result of the weight of the material, and are connected to devices, such as electrical generators, which in turn are rotated to create power.

In the prior art there have been various means for creating energy from mined products, but generally the product, such as coal, for example, must be mined and carried to the place where it will be used to create energy. In the present invention where solid material is mined for energy purposes or for purposes other than creating energy, such as limestone or various ores, which must be transferred from relatively high areas to lower areas, the transferring of the mined material by means of the present invention will thereby create energy in situ.

SUMMARY OF THE INVENTION

It is an object of the invention to provide a new means for generating power.

It is another object of the invention to provide a means for generating power by which solid material at a relatively high level is caused to flow by gravity onto fixed rotatable wheels having peripheral pockets, whereby the weight of the material in the pockets causes the wheels to rotate.

It is still another object of the invention to provide a power generating means, as described in the previous paragraph, in which a multiple number of said wheels having peripheral pockets may be positioned to successively receive in said pockets solid material moving downwardly by gravity so as to cause said wheels to rotate.

It is a further object of the invention to provide a power generating system, as described in the previous paragraphs, in which said wheels are interconnectable to rotate at the same speed and which are also connected to drive electrical generators.

It is still a further object of the invention to provide a power generating system, as described in the previous paragraphs, which may be typically installable along the side of a high hill or mountain, the solid material being caused to flow onto the wheels from a position, above the highest wheel, onto the highest wheel and the wheels below.

Further objects and advantages of the invention may be brought out in the following part of the specification wherein small details have been described for the completeness of disclosure, without intending to limit the scope of the invention which is set forth in the appended claims.

BRIEF DESCRIPTION OF THE DRAWINGS

Referring to the accompanying drawings, which are for illustrative purposes.

DESCRIPTION OF THE PREFERRED EMBODIMENTS

Figure 1:
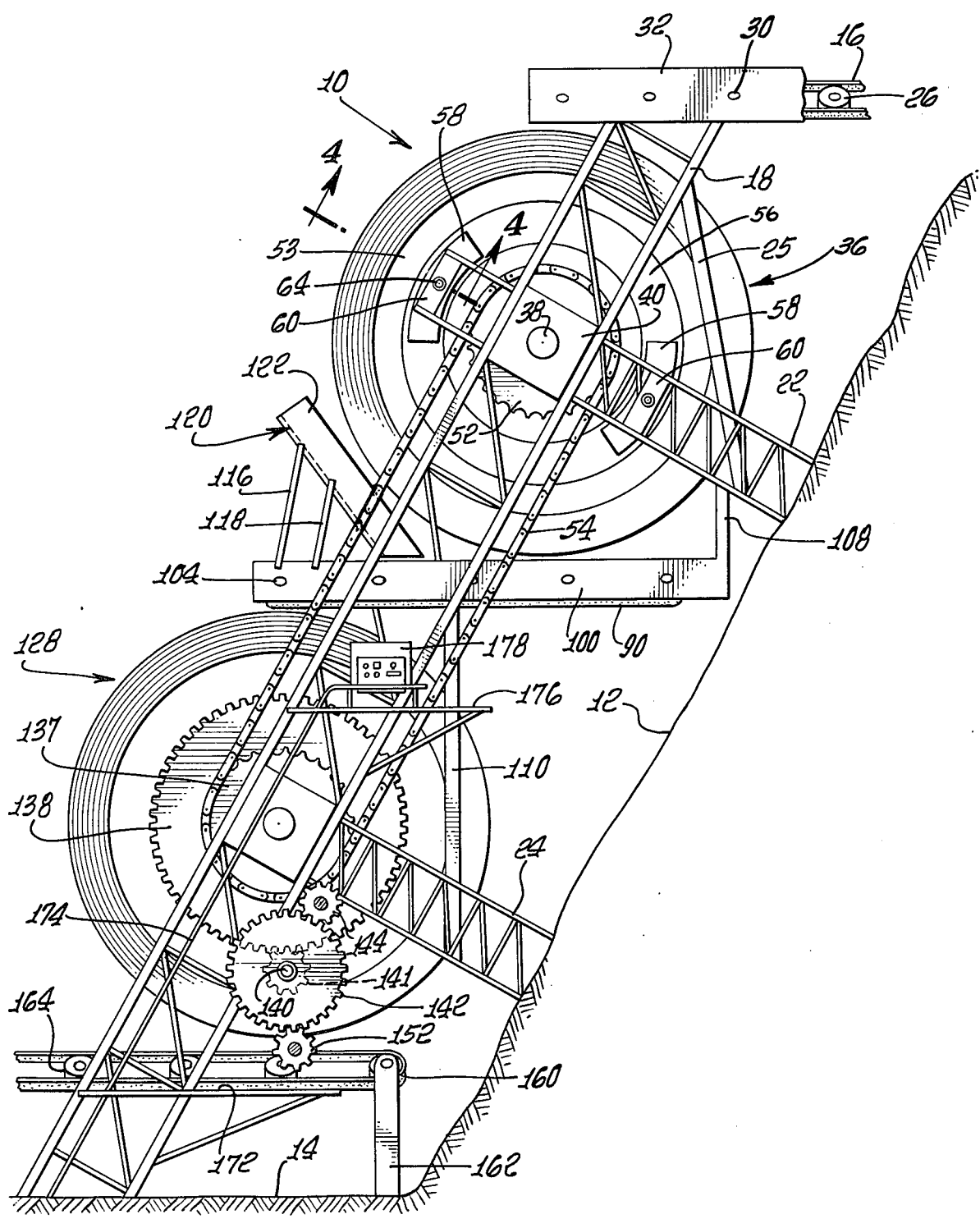
FIG. 1 is a side elevational view of a power generating unit composed of two wheels mounted on the side of a relatively steep hill.

Referring again to the drawings, there is shown a power generating system, generally designated as 10, fixedly mounted on the side of a relatively steep hill 12, and supported on a flat base 14, typically reinforced concrete.

Extending from an area adjacent the top of the hill is an endless, V-shaped conveyor belt 16, shown fragmentarily, supported by guide walls 32 and 34 connected to frames 18 and 20, mounted on the base surface 14, and which are held outwardly from the hill surface by a plurality of frame members 21, 22, 24 and 25. The members 22 and 24 are installed in concrete in the hill.

Figure 2:
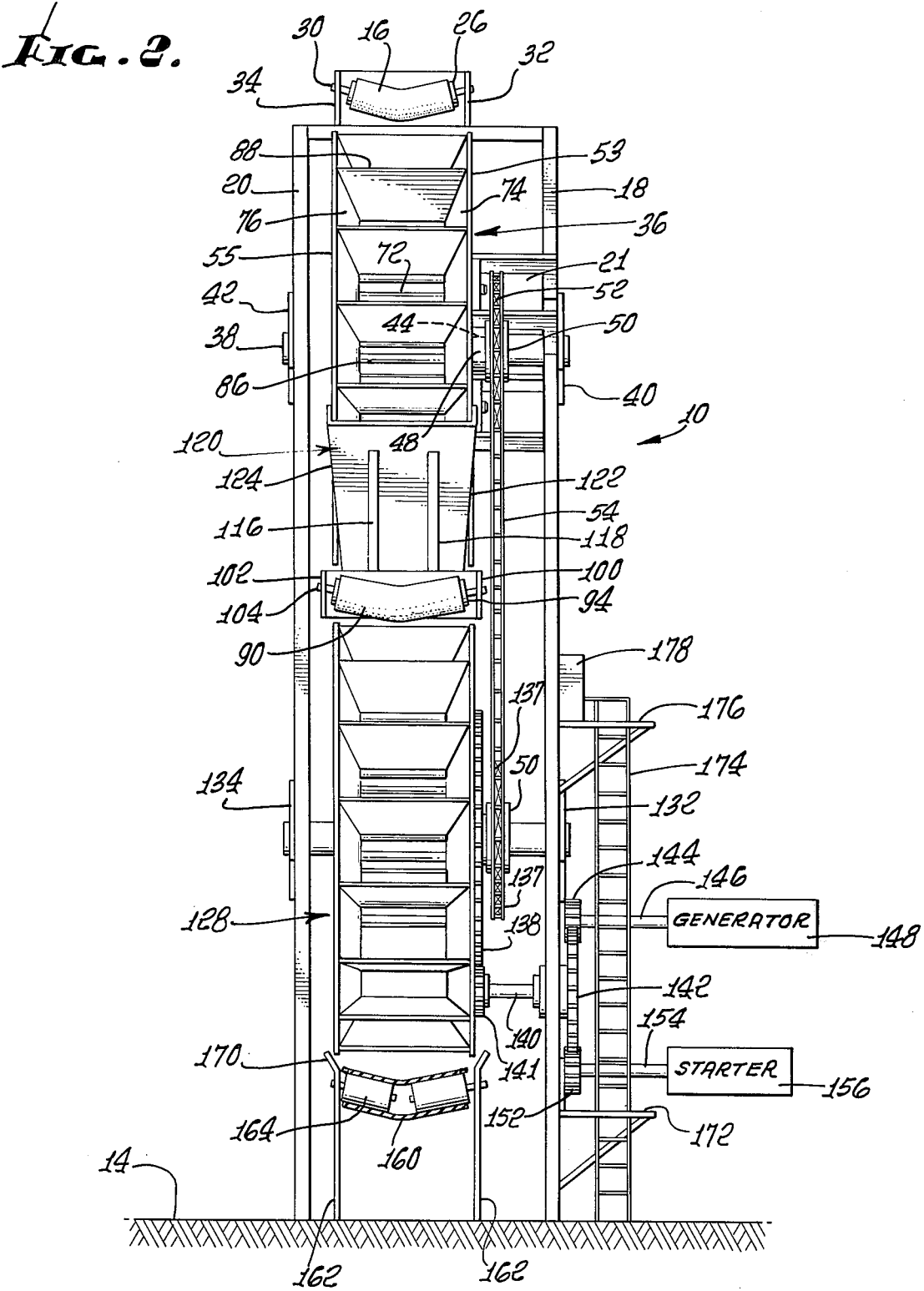
FIG. 2 is a front elevational view of the generating unit shown in FIG. 1.

The conveyor belt 16 is also supported and driven by a power driving means, not shown, at or adjacent the source of material which it carries. As shown in FIGS. 1 and 2, spaced within the upper and lower surfaces of the belt are a plurality of V-positioned rollers 26, in quantity as needed in accordance with the weight of material on the belt, each of the rollers mounted for rotation on axles 30, secured in the guide walls 32 and 34. The belt carries the material in the direction of the arrow 35 shown in FIG. 3.

Shown in FIGS. 1 and 3, mounted immediately below the belt 16 is a wheel, generally designated as 36, having its center in a shaft 38 a short distance to the right of the end of the belt. The shaft 38 is fixed in plates 40 and 42, secured respectively to frame members 18 and 20, to support the wheel.

Figure 3:
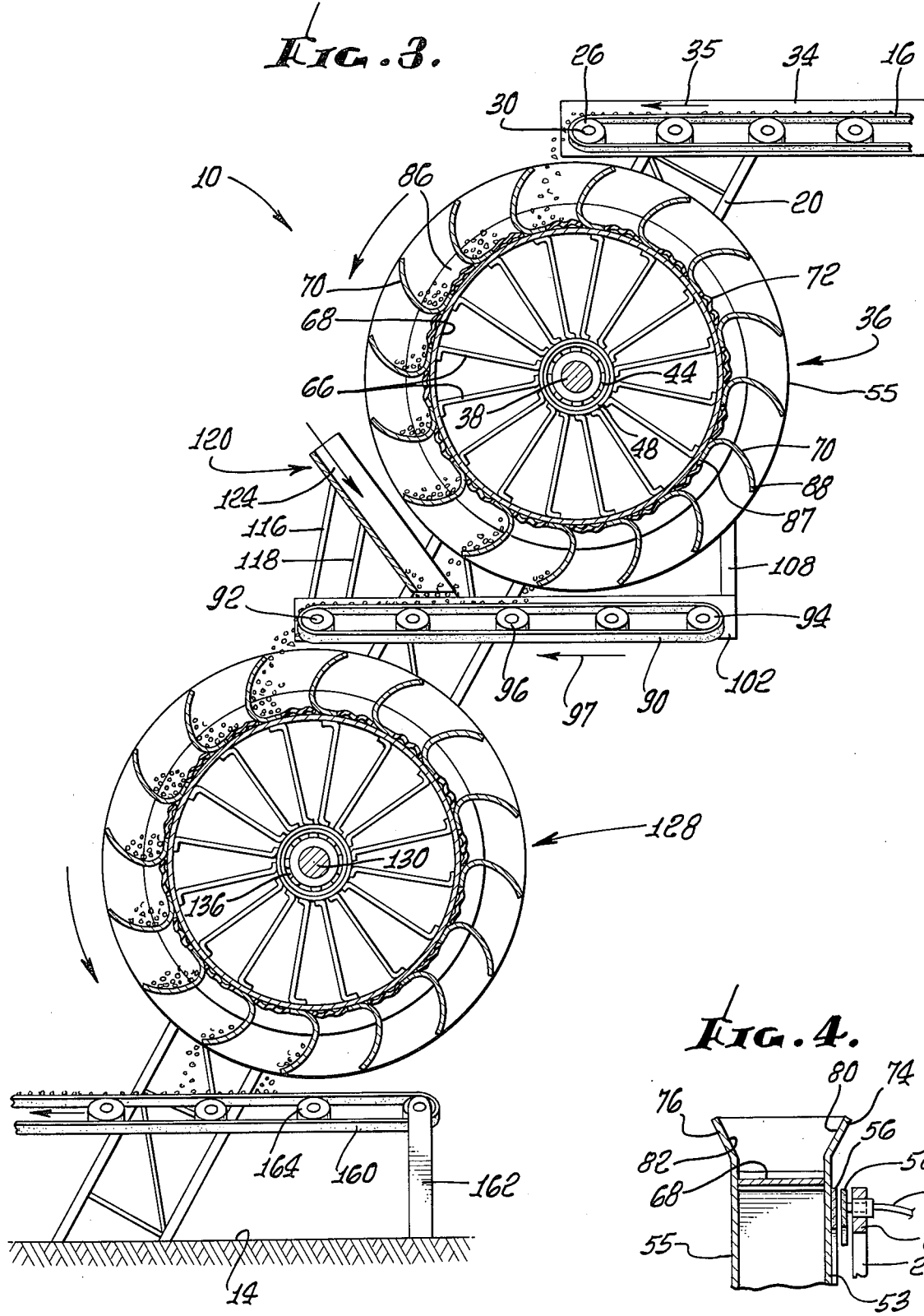
FIG. 3 is a cross-sectional view taken from the side, as shown in FIG. 1.

In FIGS. 2 and 3, the wheel is shown to be mounted on roller bearings 44 which rotate around the shaft 38, and which are surrounded by a wheel hub 48.

As shown in FIGS. 1 and 2, also secured to the wheel hub is a boss 50, and mounted for rotation therewith is a gear 52. Engaged with the gear is an endless chain 54.

Figure 4:
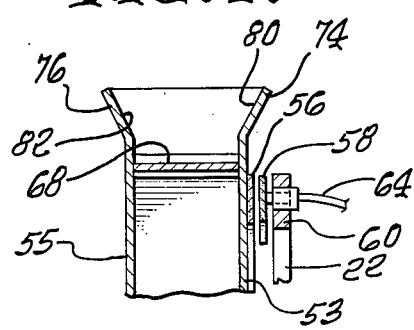
FIG. 4 is a fragmentary cross-sectional view taken along the lines 4—4 of FIG. 1.

Extending radially outwardly from the wheel hub and fixed thereto are wheel side walls 53 and 55. As shown in FIGS. 1 and 4, radially outwardly of the gear 54 on the wall 53 is an annular brake surface 56, and mounted on plates 60, supported by frame members 18, 21 and 22 on opposite sides of the gear, are brake shoes 58. The brake shoes 58 are conventionally operated by compressed air, or hydraulically, connected by a hose 64 to a power source not shown, whereby when pressure is applied to the brake shoes they move to contact the brake surface 56 to stop rotation of the wheel.

As shown in FIG. 3, secured to the wheel walls and secured to and extending radially outwardly from the hub 48 are heavy steel spokes 66. At their outer ends the spokes are secured to a ring 68 which extends axially between and secured to the walls 53 and 55. The outer surface of the ring 68, spaced between wheel blades 70, has corrugated steel strengthening members 72 bonded in rubber. The blades 70 extend axially between the walls 53 and 55 and flared wall ends 74 and 76. In cross section the blades are generally concave, having the nadir of their concavity closer to the inner circumferential wheel walls 68 than to the outer circumferences of the wheels. The axially directed edges of the blades are parallel to the walls 68 and the blades have flat inner surfaces in abutment therewith, having flared outer edges 80 and 82 abutting the wall ends 74 and 76, respectively. The concave surfaces of the blades, the members 72 and the wheel walls form peripheral pockets 86 around the periphery of the wheel. The wheel shown has 16 blades and 16 spokes, one for each blade, and the blades are spaced from about 18° to 26° of arc. Each blade is shown to have an inner end 87 and an outer end 88 in radial alignment with each other and a respective spoke. The wheel, for example, may be from 50′ to 100′ in diameter and have an axial width of approximately 10′. The wheel can be made to carry more than 10 tons of material. The pocket forming surfaces may typically be made of manganese steel.

Spaced below the wheel 36 is a second endless, V-shaped conveyor belt 90 supported for movement on V-positioned rollers 92 and 94. Between the rollers 92 and 94 are supporting rollers 96 as needed according to the weight applied to the belt. The rollers are supported by and spaced between guiding walls 100 and 102 on axles 104. The belt 90 is power driven by means not shown to operate the belt to carry the material in the direction of the arrow 97 in FIG. 3.

The guide walls 100 and 102 are supported by frame member 108 connected to frame 22 and are further supported by a plurality of frame members 110, secured to members 24. Supported upwardly on the side walls 100 and 102 by means of frame members 116 and 118 is a chute 120 positioned to the side of and in way of the wheel to carry material therefrom onto the belt 90. The chute has side walls 122 and 124, spaced apart at the top a greater distance than at the bottom to aid and guide the material from the wheel pockets to the belt surface.

A lower wheel 128, identical to the upper wheel 36, is spaced below the belt 90 with the center of its shaft 130 a short distance to the right of the discharge end of the belt. The shaft 130 is fixedly mounted to the frame members 18 and 20 in plates 132 and 134. The wheel hub rotates on roller bearings 136 and mounted on the hub is a large driving gear 138 which rotates with the wheel. Axially outwardly of the gear 138 and aligned with the gear 52 is a gear 137 mounted on a boss which also rotates with the wheel hub. The chain 54 is engaged with gears 52 and 137 so that both wheels rotate at the same speed.

As best seen in FIG. 2, mounted on the frame member 18 is a shaft 140 having a pinion 141 secured on its end for rotation therewith, the pinion being driven by the gear 138. At the other end of the shaft 140, for rotation therewith, is a gear 142 which is engaged with an upper, generator driving pinion 144 mounted for rotation on a generator shaft 146 to drive an electrical generator 148. At the lower end of the gear 142 is a disengageable starter pinion 152 supported for rotation on a shaft 154 which is the driving shaft of system starter 156, typically a diesel engine.

Positioned below the wheel 128 is a third endless conveyor belt 160 supported from the horizontal surface 14 by a plurality of supporting members 162. The belt 160 is also a V-shaped cross section and is supported by a multiple of V-positioned rollers 164, the number being determined by the weight requirement. The belt is somewhat wider than the wheel 128 to properly receive material discharged therefrom. Side walls 170 guide the material from the wheel onto the belt. The belt 160 is power driven by means not shown to move the material in the direction of the arrow in FIG. 3. Conventional vibrators can be used instead of the conveyor belts.

Just below the pinion 152 is a working platform 172 supported on the frame member 18, and extending upwardly from the surface 14 is a ladder 174 to a second platform 176 also supported on the frame member 18. On the platform 176 there is an electrical panel 178 from which the system can be operated. Each of the belts 16, 90 and 160 can be started and stopped from the panel, the brakes 58 may be actuated to stop the rotation of the wheels, and the diesel starter 156 can be started to commence the rotation of the wheels.

In operation, materials which have been mined for another purpose, or any material which can be specifically mined for use with the present invention, or if otherwise on the surface at the top of the upper level of the hill, such as large deposits of sedimentary rock, may be placed upon the upper conveyor belt 16 in any conventional manner and carried to the upper wheel. The belt functions to dump the material into the pockets 86 of the wheel which has been started in counterclockwise rotation by the diesel engine 156. The belt 16, being of substantially the same width as the wheels, can carry enough material to continuously fill the pockets 86 and thus, by providing great weight in the peripheral pockets, will cause the wheel to rotate at substantial speeds.

As best seen in FIG. 3, as the wheel 36 rotates the blades 70 are moved into position where they start to dump the solid material from the pockets onto the chute 120 and directly onto the belt. The belt 90 then carries the material to deposit it in the pockets of the second wheel 128 which is rotating at the same speed as the wheel 36, and as the second wheel rotates it dumps the material into the third belt 160, from which the material may be carried to other power generating wheels or trucks for removal from the area, for example.

When the pockets of both wheels are filled to the extent that they will hold the material prior to dumping, the wheels achieve their maximum and steady speed as long as the material is fed to the upper wheel. The size of the material is limited to the pocket size.

The system is shown to be a complete unit of two wheels, but such a system can have any number of wheels, depending upon the height of the hill or mountain along which the wheels may be positioned and supported. Electrical generators can be connected to various groups of wheels, or can be connected to be driven only by the lowest wheel, depending upon the revolutions per minute of the wheels in the system or of any single wheel and the sizes of the generators. The operation of the system depends on the availability of large deposits of sedimentary rock or other mined material, such as limestone, which is typically retrieved from the earth for reasons other than to generate power directly.

After the installation has been made, the cost of operation of the system is relatively low, particularly if the solid material used for rotating the wheel is such that it is going to be mined and conveyed irrespective of its use for generating power according to the present invention.

Figure 5:
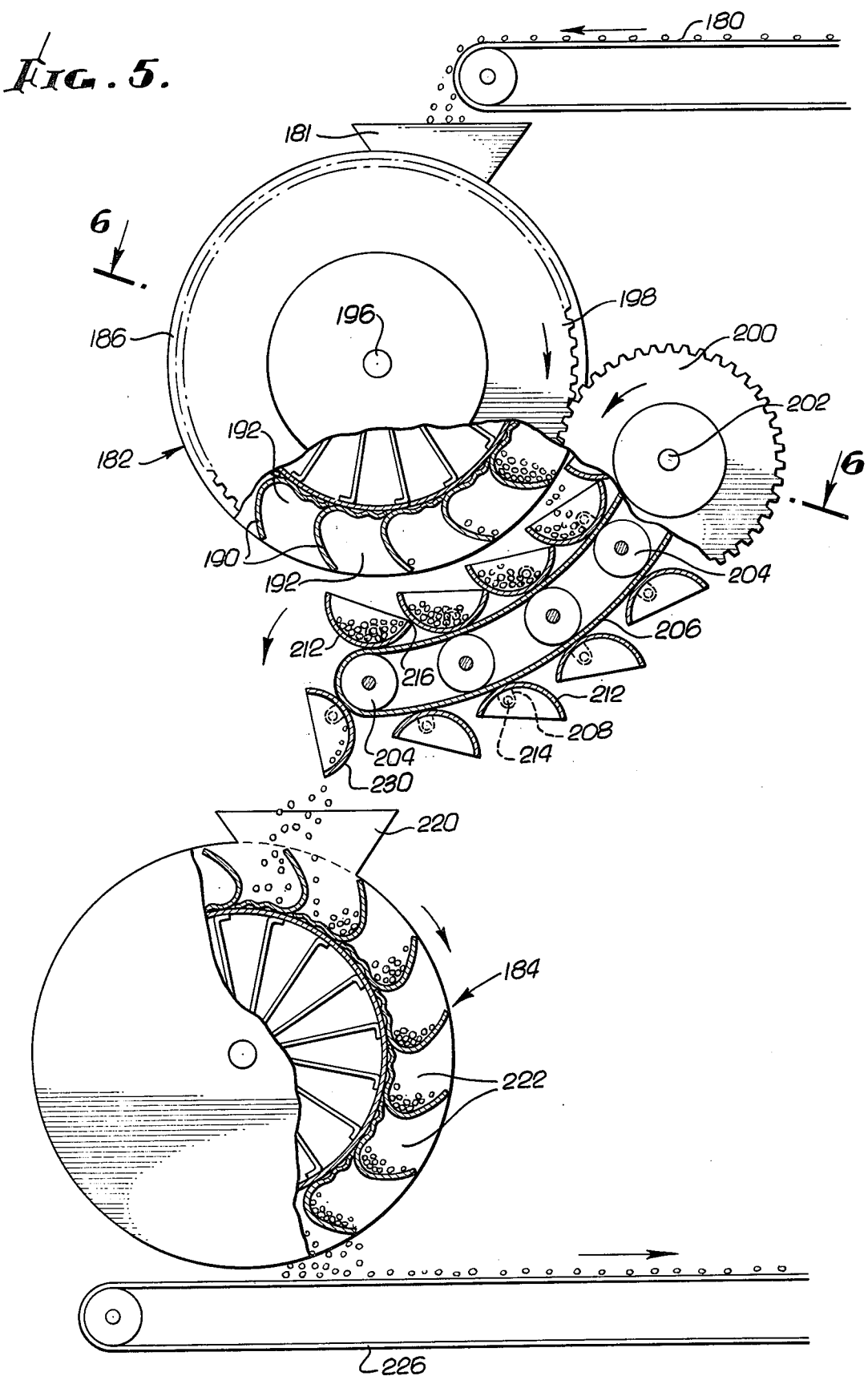
FIG. 5 is a side elevational view of another embodiment of the invention.
Figure 6:
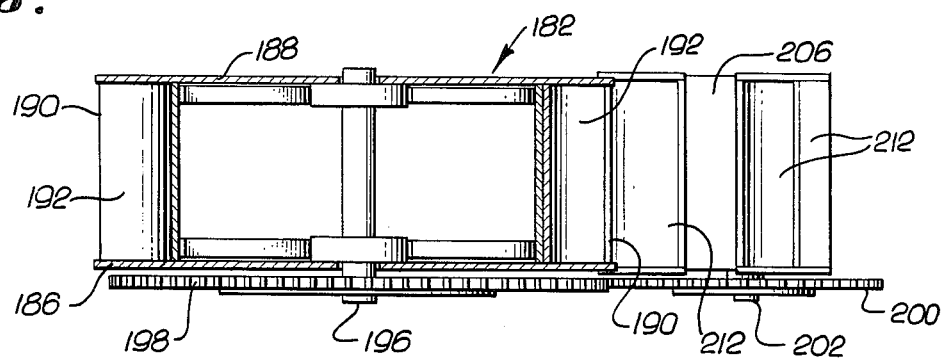
FIG. 6 is a partially cross-sectional view, taken along the lines 6—6 of FIG. 5.
Figure 7:
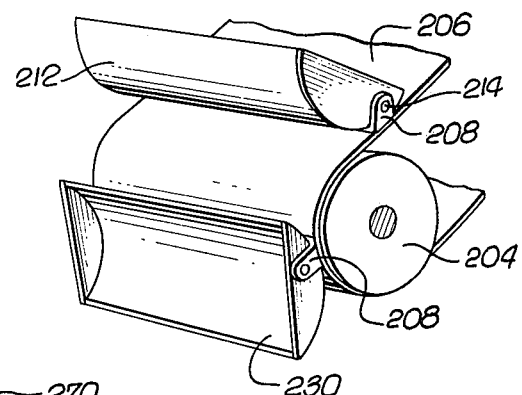
FIG. 7 is a fragmentary view illustrating the buckets and the conveyor belt shown in FIG. 5.

In FIGS. 5–7 another embodiment of the invention is illustrated. Here the upper conveyor belt 180 and the wheels 182 and 184 are the same as the belt 16, the wheel 36 and the wheel 128, respectively, in FIG. 3. The wheel 182 has side walls 186 and 188 and has peripherally spaced blades 190 forming pockets 192 spaced therebetween. The wheel is adapted to be supported on frame members on the side of the hill, similar to those shown in FIG. 1, on which it is mounted for rotation on a shaft 196. Because the upper and lower wheels are mounted to be offset a lesser amount than those in FIG. 1, some excavation will be necessary for installation. Secured to the frame structure to guide material from the belt 180 to pockets 192 is a hopper 181.

Also mounted on the shaft 196 for rotation with the wheel is a large ring gear 198 engaged to drive a ring gear 200, mounted on a shaft 202. Mounted for rotation on shaft 202 is a roller 204, not shown, which drives a continuous conveyor belt 206 when the wheel 182 is rotated. The conveyor belt is also mounted on idler rollers 204 which are supported on the frame structure.

Secured to the exterior of the belt are pairs of ears 208 equally spaced and on which are supported buckets 212 by pivot pins 214. The buckets are elongated and extend substantially the width of the belt, but are somewhat longer than the pockets 192. The buckets are generally semicircular in cross section and are supported by the pivots, offset so that on the upper portion of the belt the weight of the buckets to the left of the pivots will move their right ends 216 to be sealingly engaged with the buckets on the right. When the buckets are filled with material, its weight further insures that the buckets pivot upwardly to the right and downwardly to the left to make sealing contact.

A lower hopper 220 is secured on the frame structure to guide material from dumping bucket 230 into pockets 222 of the lower wheel 184. The wheel 184 is shown to empty on a conveyor 226 supported on the frame structure, in the same manner as shown in FIG. 3 with respect to the conveyor 160.

In this embodiment a generator, such as the generator 148, is connected directly to each wheel, as shown in FIG. 2, and a chain, such as 54, is not used. This provides the advantage of eliminating the weight of the chain and all of the driving power of the wheel is applied directly to the generator.

When the wheel 186 is initially rotated by a starter 156, as shown in FIG. 2, the belt 206 is also started by the driving of the gear 200. As the material fills the pockets 192 so as to cause the wheel 186 to rotate to develop power, the pockets in the lower right quadrant of the wheel will empty into the buckets 212 as the wheel rotates downwardly to the lowest level. The pockets start to discharge at about 20° below the horizontal and thus each pocket empties as it passes over the series of moving buckets thereunder. Because of the sealing arrangement at 216, all of the material that is discharged from the wheel is maintained in the pockets which are weighted to create a driving force downwardly on the belt 206. None of the material conveyed into the wheel leaves the buckets and wheel combination until the bucket 230 goes over the end of the belt and dumps. That is, the wheel and belt maintain all of the material received from the conveyor 180 for approximately 180° of rotation whereby substantially the entire weight of the material that could be carried by the wheel through its rotation of 180° provides driving energy to the generator just as though it had been held within the wheel for the 180° of rotation. It is expected that this embodiment is approximately 15 percent more efficient than the embodiment shown in FIGS. 1–3.

Figure 8:
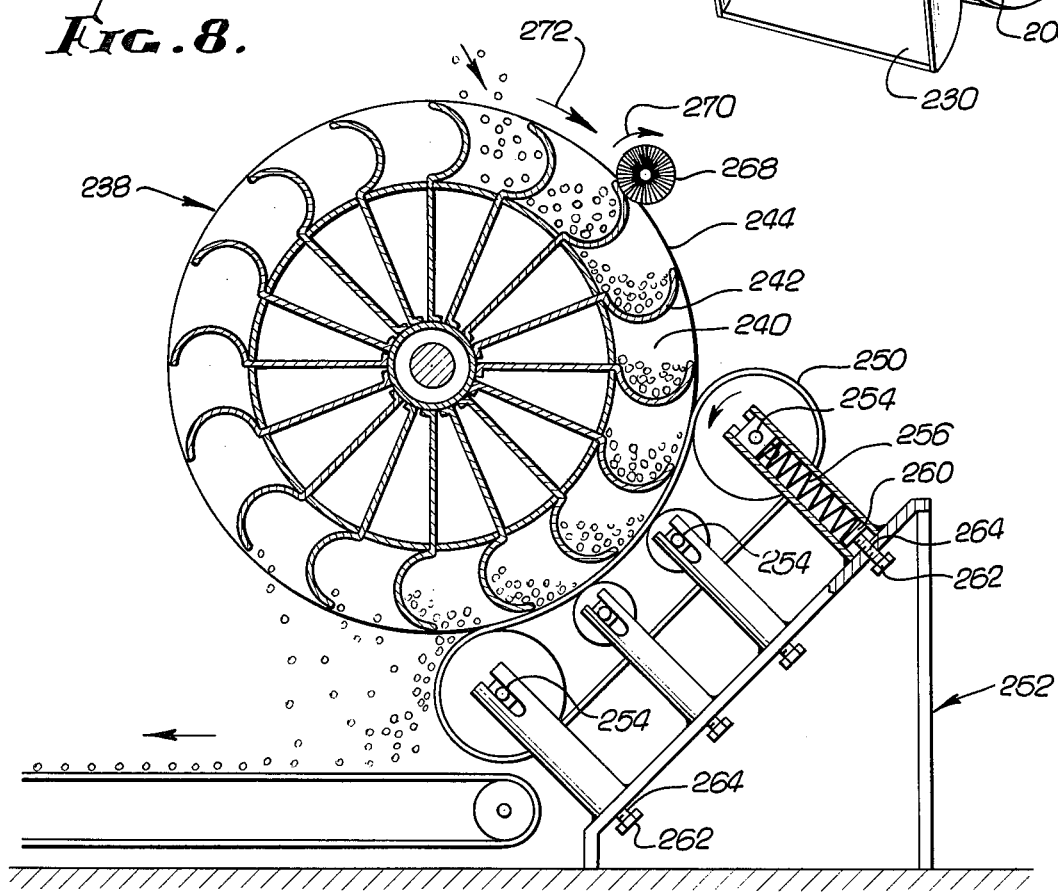
FIG. 8 is a cross-sectional view of still another embodiment of the invention.

In FIG. 8 a third embodiment is illustrated. Here, a wheel 238, similar to the wheel 184, has slightly differently shaped pockets 240 and blades 242. The pockets are closed by side walls 244 in the same manner as the other wheels.

In congruent relationship with the wheel 238 for a portion of its lower right hand quadrant is a continuous sealing belt 250 positioned to be in sealing contact with the periphery of the side walls and the outer ends of the blades.

The belt 250 is mounted on the frame structure 252 by means of floating bearings 254 biased by springs 256 to maintain the upper side of the belt in sealing contact with the periphery of the wheel. Tightness of the belt on the wheel is adjustable by means of discs 260 which are movable toward and away from the springs by handles 262 connected to the discs by threaded stems 264.

In order to protect the belt, a rotatable brush 268, motor driven in the direction of the arrow 270 and supported on the frame structure, is in contact with the periphery of the wheel above the belt 250 to remove any material on the periphery of the wheel before it moves into contact with the belt.

As the pockets of the wheel are filled at the top, as shown, it rotates in the direction of the arrow 272, and during the rotation of the wheel through the first right-hand quadrant and to about 20° therebelow, all of the material remains in the wheel pockets. As may be seen in FIG. 8, at about 20° below the horizontal the material in the pockets would tend to be gravity discharged from the wheel. In this embodiment the sealing belt 250 effectively holds the material within the wheel so that substantially all of the weight carried by the wheel during the 180° of rotation is converted into energy for driving a generator connected to the wheel. This embodiment also produces about 15 percent greater efficiency than that shown in FIGS. 1–3.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific form shown or uses mentioned except as defined in the accompanying claims, wherein various portions have been separated for clarity of reading and not for emphasis.

I claim:
1. A gravity flow power generating system, comprising:
   means for supplying solid material for gravity flow from a predetermined upper level;
   a first wheel mounted for rotation on a substantially horizontal axis below said upper level for receiving said material flowing from said means;

peripheral pockets in said first wheel being open to the periphery thereof for carrying said material, said material in said first wheel providing weight adjacent the periphery thereof to cause it to rotate, said pockets when rotated to a predetermined lower level adapted to gravity discharge said material; and material receiving means closely adjacent said first wheel to receive said material therefrom and to be driven by the rotation thereof, said material receiving means being adapted to gravity discharge said material.

2. A system according to claim 1 including:

a second wheel mounted for rotation on a substantially horizontal axis below said first wheel and said material receiving means, said second wheel having peripheral pockets open to the periphery thereof and positioned to receive said material discharged from said material receiving means, the weight of said material in said second wheel being adapted to cause it to rotate and gravity discharge said material.

3. A system according to claim 2 including:

means connecting said first and second wheels to be driven by the rotation thereof.

4. A system according to claim 1 in which:

said material receiving means includes a conveyor belt positioned below a portion of said first wheel and being adapted to receive said material therefrom adjacent said portion.

5. A system according to claim 4 in which:

said last means is substantially complementary to said wheel portion.

6. A system according to claim 5 in which said last means includes:

a conveyor belt carrying buckets to receive said material from said wheel portion, said buckets opening upwardly toward said wheel pockets of said portion.

7. A system according to claim 6 in which:

said buckets are spaced and rotatable on said belt so as to be in contact with adjacent buckets when they are weighted with said material therein.

8. A system according to claim 6 in which:

said buckets are spaced and pivotally mounted on said belt so as to be rotatable by the weight of said material received therein, the pivots extending generally parallel to the axis of the wheel and said buckets being elongated in the direction of said axis, said buckets being in contact with adjacent buckets when they are weighted with said material therein.

9. A system according to claim 8 in which:

said buckets are generally semicircular in cross section, said conveyor belt extending downwardly along said wheel, said bucket pivots being offset upwardly with respect to a central point of said cross section.

10. A system according to claim 9 including:

a second wheel mounted for rotation on a substantially horizontal axis below said first wheel and said buckets, said second wheel having peripheral pockets open to the periphery thereof and positioned to receive said material discharged from said buckets, the weight of said material in said second wheel being adapted to cause it to rotate and gravity discharge said material.

11. A system according to claim 10 including:

a conveyor belt under the second wheel for receiving the material therefrom and for carrying it away from said second wheel.

12. A system according to claim 11 including:

a power driven starter connected to said wheels to start the rotation thereof.

13. A system according to claim 12 in which:

said second wheel rotates in the same direction as the first wheel, the horizontal axes of the wheels being horizontally offset so that the material from the first wheel enters the second wheel adjacent the top thereof.

14. A system according to claim 1 in which:

said material receiving means is positioned directly under a lower portion of said wheel to receive the material from said wheel so that the full weight of the material in the wheel and in the material receiving means is effective to drive the wheel and said last means.

15. A gravity flow power generating system, comprising:

means for supplying solid material for gravity flow from a predetermined upper level;

a wheel mounted for rotation on a substantially horizontal axis below said upper level for receiving said material flowing from said means;

peripheral pockets in said wheel being open to the periphery thereof for carrying said material, said material in said wheel providing weight adjacent the periphery thereof to cause it to rotate, and sealing means on the periphery of said wheel to hold the material in said pockets until rotated to a low level of the wheel where the material is gravity discharged.

16. A system according to claim 15 in which:

said sealing means is a belt in congruent contact with the lower portion of the wheel periphery and being positioned to close the pockets to prevent discharge of the material therein.

17. A system according to claim 15 in which:

said belt is continuous and mounted on rollers having floating bearings, said belt being driven by the rotation of the wheel so as to travel on said rollers.

18. A system according to claim 17 in which:

said bearings are spring biased to hold the belt against the wheel.

19. A system according to claim 18 in which:

said wheel is connected to drive an electrical generator.

20. A system according to claim 18 in which:

a rotatable brush on the wheel periphery and having an axis parallel to the axis of the wheel, said brush being above said belt to clean material off the wheel and outer portions of the pockets to protect the belt.

21. A system according to claim 9 in which:

material is discharged from said buckets only at the lower end of said belt.

* * * * *